United States Patent
Jankowski, Jr.

(10) Patent No.: US 10,482,182 B1
(45) Date of Patent: Nov. 19, 2019

(54) NATURAL LANGUAGE UNDERSTANDING SYSTEM AND DIALOGUE SYSTEMS

(71) Applicant: CloudMinds Technology, Inc., Santa Clara, CA (US)

(72) Inventor: Charles Robert Jankowski, Jr., Fremont, CA (US)

(73) Assignee: CloudMinds Technology, Inc., Santa Clara, CA (US)

( * ) Notice: Subject to any disclaimer, the term of this patent is extended or adjusted under 35 U.S.C. 154(b) by 0 days.

(21) Appl. No.: 16/134,851

(22) Filed: Sep. 18, 2018

(51) Int. Cl.
| | |
|---|---|
| G06F 17/27 | (2006.01) |
| G10L 15/18 | (2013.01) |
| G06K 9/34 | (2006.01) |
| G10L 15/30 | (2013.01) |
| G10L 15/22 | (2006.01) |

(52) U.S. Cl.
CPC ......... *G06F 17/2785* (2013.01); *G06K 9/344* (2013.01); *G10L 15/1815* (2013.01); *G10L 15/22* (2013.01); *G10L 15/30* (2013.01); *G06K 2209/01* (2013.01)

(58) Field of Classification Search
USPC ..................................... 704/235, 231, 1–504
See application file for complete search history.

(56) References Cited

U.S. PATENT DOCUMENTS

| | | | | |
|---|---|---|---|---|
| 7,548,847 B2* | 6/2009 | Acero | ................... | G06F 17/241 704/1 |
| 7,904,297 B2* | 3/2011 | Mirkovic | ................ | G06F 17/28 704/235 |
| 8,036,877 B2* | 10/2011 | Treadgold | ........... | G06F 17/2785 704/9 |
| 8,515,736 B1* | 8/2013 | Duta | ................... | G10L 15/1822 704/9 |
| 8,612,229 B2* | 12/2013 | Balchandran | ........... | G10L 15/18 704/270 |
| 8,781,833 B2* | 7/2014 | Duta | .................... | G10L 15/063 704/257 |
| 9,384,190 B2* | 7/2016 | Balchandran | ........... | G10L 15/18 |
| 9,560,089 B2* | 1/2017 | Lynch | ................... | H04L 65/403 |
| 9,620,110 B2* | 4/2017 | Duta | .................... | G10L 15/063 |
| 10,192,543 B2* | 1/2019 | Balchandran | ........... | G10L 15/18 |
| 10,402,501 B2* | 9/2019 | Wang | ................ | G06F 16/90332 |

(Continued)

*Primary Examiner* — Marcus T Riley (74) *Attorney, Agent, or Firm* — Syncoda LLC; Feng Ma (57) ABSTRACT

A natural language understanding (NLU) system used in a dialogue systems comprises a first-level NLU sub-system and at least one second-level NLU sub-system. Each second-level NLU sub-system is communicatively coupled with, and has a relatively higher performance than, the first-level NLU sub-system. The first-level NLU sub-system performs a first calculation over an input text received, and then outputs a first meaning if the first meaning is generated with a first confidence level surpassing a first threshold or passes on the input text to one second-level NLU sub-system based on a pre-determined rule if otherwise. Each second-level NLU sub-system receives the input text from the first-level NLU sub-system, and performs a second calculation over the input text, and then outputs a second meaning if the second meaning is generated with a second confidence level surpassing a second threshold or outputs a result indicating a rejection of meaning if otherwise.

22 Claims, 8 Drawing Sheets

(56) References Cited

U.S. PATENT DOCUMENTS

| | | | | |
|---|---|---|---|---|
| 2003/0191625 A1* | 10/2003 | Gorin | ............... | G06F 17/278 |
| | | | | 704/1 |
| 2006/0271364 A1* | 11/2006 | Mirkovic | ............ | G06F 17/28 |
| | | | | 704/239 |
| 2009/0144248 A1* | 6/2009 | Treadgold | ........ | G06F 17/2785 |
| 2018/0314689 A1* | 11/2018 | Wang | ............ | G06F 17/2785 |

* cited by examiner

NATURAL LANGUAGE UNDERSTANDING SYSTEM AND DIALOGUE SYSTEMS

TECHNICAL FIELD

The present disclosure relates generally to the field of natural language processing (NLP), specifically to a natural language understanding (NLU) system, and more specifically to an NLU system having multiple NLU sub-systems with a layered structure, as well as a dialogue systems comprising the NLU system.

BACKGROUND

A dialogue systems is a computer systems intended to perform a human-machine interaction by means of various modes for communication, such as text, speech, graphics, haptics, and gestures, etc.

With a rapid development of artificial intelligence, as well as with the rapidly emerging hardware and software technologies, the dialogue systems has been widely applied in a lot of fields including business enterprises, education, government, healthcare, entertainment, etc., and have also seen quite many applications in these fields, such as call centers for customer services, training and education, technical support, help desks, etc.

SUMMARY OF THE INVENTION

In a first aspect, the present disclosure provides a natural language understanding (NLU) system, which is configured for determining a meaning of an input text.

The NLU system comprises a first-level NLU sub-system and at least one second-level NLU sub-system. The first-level NLU sub-system is configured to receive the input text, and each of the at least one second-level NLU sub-system is communicatively coupled with, and has a relatively higher performance than, the first-level NLU sub-system.

The first-level NLU sub-system is configured, upon receiving the input text, to perform a first calculation over the input text, and then to output the first meaning if the first calculation generates a first meaning corresponding to the input text with a first confidence level surpassing a first threshold; or to pass on the input text to one of the at least one second-level NLU sub-system based on a pre-determined rule if otherwise.

Each of the at least one second-level NLU sub-system is configured, upon receiving the input text from the first-level NLU sub-system, to perform a second calculation over the input text, and then to output the second meaning if the second calculation generates a second meaning corresponding to the input text with a second confidence level surpassing a second threshold; or to output a result indicating a rejection of meaning if otherwise.

In the NLU system described above, the performance can be evaluated from an F1 standpoint. In other words, each of the at least one second-level NLU sub-system has a relatively higher performance than the first-level NLU sub-system determined from an F1 standpoint.

According to some embodiments of the natural language understanding (NLU) system, each of the at least one second-level NLU sub-system has a relatively richer user interface than the first-level NLU sub-system. Each of the at least one second-level NLU sub-system is further configured to periodically receive a first manual update for NLU elements, and the first-level NLU sub-system is further configured to periodically receive a first automatic update for NLU elements from each of the at least one second-level NLU sub-system.

In the above mentioned embodiments of the natural language understanding (NLU) system, the first-level NLU sub-system can optionally be further configured to receive a second manual update for NLU elements, and accordingly, each of the at least one second-level NLU sub-system can be further configured to periodically receive a second automatic update for NLU elements from the first-level NLU sub-system.

In the natural language understanding (NLU) system, the meaning corresponding to the input text (i.e. at least one of the first meaning or the second meaning) can be in a format of intent and slot.

According to some embodiments of the natural language understanding (NLU) system, the first-level NLU sub-system comprises a first calculation module and a first determination module. The first calculation module is configured to perform the first calculation over the input text to thereby generate a first result from the first calculation, and the first determination module is configured to receive the first result from the first calculation module, and then to determine whether the first result comprises a meaning having a confidence level surpassing the first threshold (i.e. the aforementioned first meaning).

According to some embodiments of the natural language understanding (NLU) system, each of the at least one second-level NLU sub-system comprises a second calculation module and a second determination module. The second calculation module is configured to perform the second calculation over the input text to thereby generate a second result from the second calculation, and the second determination module is configured to receive the second result from the second calculation module, and then to determine whether the second result comprises a meaning having a confidence level surpassing the second threshold (i.e. the aforementioned second meaning).

Optionally, in the natural language understanding (NLU) system described above, each of the at least one second-level NLU sub-system can comprise a first user interface, which is configured to allow a first human agent to manually update configuration of NLU elements in the each of the at least one second-level NLU sub-system therethrough.

Further optionally, in the natural language understanding (NLU) system described above, each of the at least one second-level NLU sub-system can comprise a second user interface, and the first-level NLU sub-system can comprise a third user interface. The second user interface and the third user interface are together configured to allow a first automatic periodic update of configuration of NLU elements from the each of the at least one second-level NLU sub-system to the first-level NLU sub-system.

Furthermore, the first-level NLU sub-system can further comprise a fourth user interface, which is configured to allow a second human agent to manually update configuration of NLU elements in the first-level NLU sub-system therethrough, and the second user interface and the third user interface are together further configured to allow a second automatic periodic update of configuration of NLU elements from the first-level NLU sub-system to the each of the at least one second-level NLU sub-system.

According to some embodiments of the natural language understanding (NLU) system, a number of the at least one second-level NLU sub-system is one.

According to some other embodiments of the natural language understanding (NLU) system, a number of the at least one second-level NLU sub-system is more than one. As such, each of the at least one second-level NLU sub-system can be specific to a different domain, and the pre-determined rule can be based on domain information associated with the input text. Alternatively, each of the at least one second-level NLU sub-system can be specific to a different system, and the pre-determined rule can be based on system information associated with the input text. Further alternatively, the pre-determined rule can be based on availability of each of the at least one second-level NLU sub-system.

In a second aspect, the present disclosure further provides a dialogue systems.

The dialogue systems comprises a natural language understanding (NLU) component, which substantially comprises a natural language understanding (NLU) system according to any one of the embodiments as described above.

According to some embodiments of the disclosure, the dialogue systems further comprises an input decoder, which is configured to convert a user input into the input text for the natural language understanding (NLU) component.

Herein optionally, the input decoder can include an automatic speech recognizer (ASR) component, which is configured to convert a speech from a user into the input text.

Optionally, the input decoder can include an optical character recognizer (OCR) component, which is configured to convert characters in an image into the input text.

According to some embodiments of the dialogue systems, the natural language understanding (NLU) component comprises an electronic device and at least one server. The electronic device is provided with the first-level NLU sub-system of the natural language understanding (NLU) system, and the at least one server is respectively provided with the at least one second-level NLU sub-system of the natural language understanding (NLU) system. The electronic device is communicatively connected with each of the at least one server to thereby allow communication between the first-level NLU sub-system and each of the at least one second-level NLU sub-system.

Herein, the electronic device can be a smartphone, a smart speaker, a tablet computer, a laptop, or a personal computer, but can also be a computing device of other types as well.

Herein, each of the at least one server can optionally be in a cloud.

Throughout the disclosure, each of the terms "systems", "system", "sub-system", "module", "interface", and alike, is referred to as a computer-implemented functional entity, which can comprise at least one processor and a memory, wherein the memory is configured to store a software program (i.e. computer codes or executable instructions), and the at least one processor is configured to perform a calculation based on the software program stored in the memory to thereby perform a task carrying out the pre-scribed functionality. Furthermore, the at least one processor may include one or more controllers, general processors, specialized processors, coprocessors, etc., and the at least one processor can be arranged in a parallel processing structure and/or multiprocessing structure.

In addition, each of the terms "component", "device", "server", and alike, may be a general computer having the software program, or can be a hardware computing device specifically designed for such a task. The computer and the hardware computing device can be locally arranged, or can be remotely arranged, such as on an intranet, an internet, or in a cloud.

BRIEF DESCRIPTION OF DRAWINGS

To more clearly illustrate some of the embodiments disclosed herein, the following is a brief description of drawings. The drawings in the following descriptions are only illustrative of some embodiments. For those of ordinary skill in the art, other drawings of other embodiments can become apparent based on these drawings.

DETAILED DESCRIPTION OF DRAWINGS

In the following, with reference to the above mentioned drawings of various embodiments disclosed herein, the technical solutions of the various embodiments of the disclosure will be described in a clear and fully understandable way.

It is noted that the described embodiments are merely a portion, but not all, of the embodiments of the disclosure. Based on the described embodiments of the disclosure, those ordinarily skilled in the art can obtain other embodiment(s), which shall come within the scope sought for protection by the disclosure.

A dialogue systems is a computer systems intended to perform a human-machine interaction by means of various modes for communication, such as text, speech, graphics, haptics, and gestures, etc.

Figure 1:
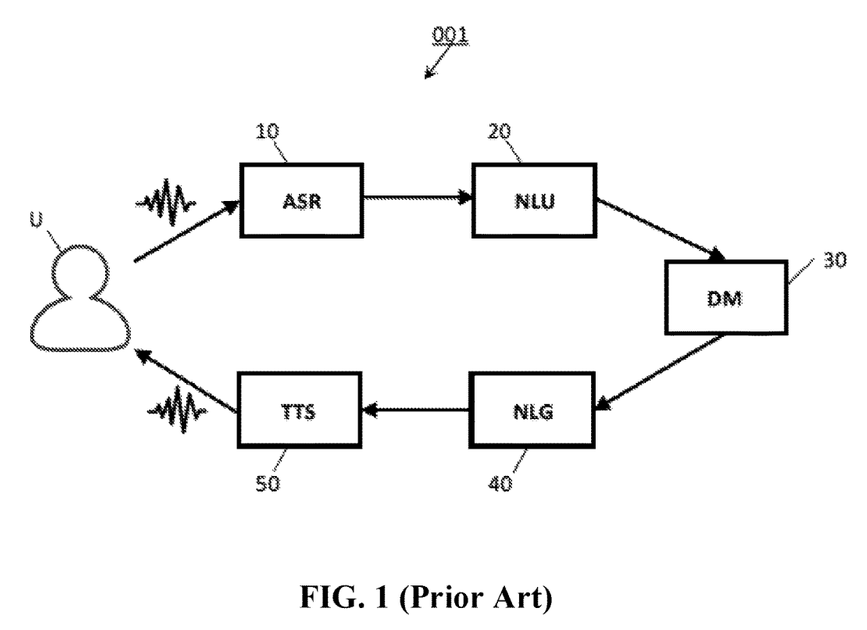
FIG. 1 illustrates a block diagram of a dialogue systems according to certain existing technology.

FIG. 1 illustrates a typical speech-based automatic dialogue systems based on an existing technology. As shown in the figure, the automatic dialogue systems 001 substantially comprises five components, including an automatic speech recognition (ASR, also known as speech-to-text or STT) component 10, a natural language understanding (NLU) component 20, a dialog management (DM) component 30, a natural language generation (NLG) component 40, and a text-to-speech (TTS) component 50.

The ASR component 10 takes an acoustic signal (i.e. utterance) received from a speaker U, and then converts the utterance into a sequence of words, which are essentially a plain text decoded by the ASR component 10. In one illustrating example, the sequence of words may include: "I want to fly from Boston to New York tomorrow."

Upon receiving the sequence of words from the ASR component 10, the NLU component 20 can obtain a meaning therefrom and then output the meaning to the DM component 30 for further action. The meaning is substantially a semantic representation corresponding to the utterance that can be understood and processed by a computer, and typically include intent and slots, and optionally also include other information such as sample phrases, and responses, etc. The typical process for the NLU component 20 to obtain the meaning from the input sequence of words involves intent classification and slot filing. With further reference to the above example, the intent is that the user wants to fly somewhere, and the pre-defined slots include: a fromCity slot to be filled with "Boston", a toCity slot with "New York," and a date slot with "tomorrow."

Yet it is possible for the NLU component 20 to return "no answer" or to reject the sequence of words, if it cannot determine the meaning, or if the confidence level is not high enough. Such result is typically also outputted to the DM component 30.

The DM component 30 takes the meaning or other outputs from the NLU component 20 and then produces an abstract representation of how the dialogue systems 001 should respond to the speaker U (i.e. output response representation). The output response representation is then sent to the NLG component 40 for conversion into a response text (i.e. a string of words) to be spoken by the dialogue systems 001. The TTS component 50 then takes the string of words (and possible additional markup) from the NLG component 40 and produces an acoustic speech waveform to be played back to the speaker U to thereby conclude a cycle of dialog between the speaker and the machine running the automatic dialogue systems 001.

It is typical that, for each dialogue systems 001, the ASR component 10 and the TTS component 50 might be application- and domain-independent, whereas each of the NLU component 20, the DM component 30, and the NLG component 40 would be very application-dependent, and thus would have to be constructed differently for each application.

In the dialogue systems 001, the NLU component 20 typically requires to define aspects including: allowed intents (e.g., makeFlight, etc.), allowed slots (e.g., fromCity, toCity, date, etc.) and allowed values of the slots (e.g. "Boston," "New York," "tomorrow," etc.), phrases representing or triggering each intent, and sometimes responses for each intent, etc., so as to allow these NLU-defined aspects to be employed in the DM component 30 and the NLG component 40 for proper subsequent actions. In order to make it easy for application designers and developers to specify, or to configure, the above aspects in the NLU component 20, the NLU component 20 is commonly provided with a highly developed user interface, such as a graphical user interface (GUI).

In accordance with the requirement for continuously updating the specification or configuration of these above aspects in an NLU system run in the NLU component 20 to make them up-to-date, the dialogue systems 001 is typically provided with a periodic configuration phase when the system updates and configurations as described above are specified and performed, in addition to a regular run-time phase when the system itself is deployed in the field, running the automatic dialog with speakers.

This invention disclosed herein intends to address the NLU component 20 in the dialogue systems 001 as described above. More specifically, this disclosure provides a system and a method for combining multiple NLU subsystems, so as to provide a relatively high performing and cost-effective NLU result, and a best experience to the user.

In a first aspect, a natural language understanding (NLU) system is provided.

Figure 2:
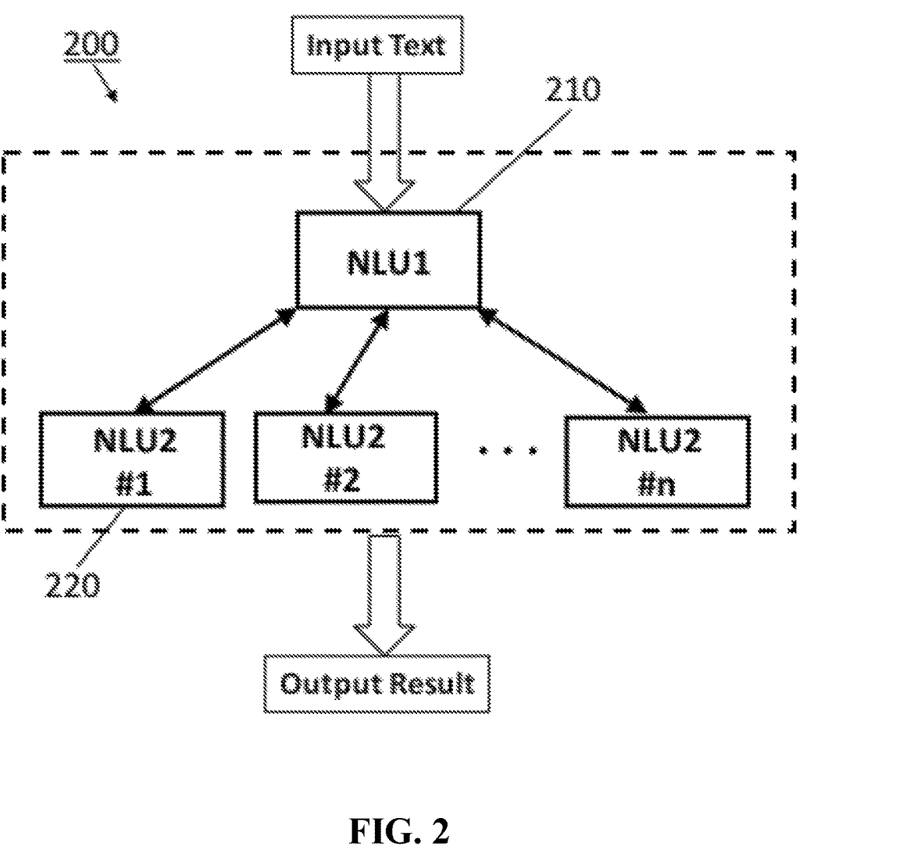
FIG. 2 illustrates a block diagram of an NLU system according to some embodiments of the disclosure.

FIG. 2 illustrates a block diagram of an NLU system according to some embodiments of the disclosure. As shown in FIG. 2, the NLU system 200 has substantially a layered structure, and includes a first-level NLU sub-system (shown as "NLU1") 210 and at least one second-level NLU sub-system (shown as "NLU2 #i", where i=1, 2, ..., n, and n≥1) 220.

The first-level NLU sub-system 210 is configured to directly receive an input text and is communicatively coupled to each of the at least one second-level NLU sub-system 220, and each of the at least one second-level NLU sub-system 220 is configured to be able to indirectly receive the input text from the first-level NLU sub-system 210.

The first-level NLU sub-system 210 and the at least one second-level NLU sub-system 220 are each substantially a functionally operable natural language understanding system (NLU system) configured to be able to obtain a meaning from a text that is inputted thereto, and are together configured to work collaboratively to thereby form a synthesized NLU system (i.e. the NLU system 200 as indicated by the box with dotted lines in the figure), which can receive the input text, perform a calculation over the input text for obtaining a meaning therefrom, and then output a result of the calculation (i.e. the "output result" in the figure).

The NLU system 200 is further configured such that the first-level NLU sub-system 210 is relatively more cost-effective on a per-transaction basis than each of the at least one second-level NLU sub-system 220, whereas each of the at least one second-level NLU sub-system 220 has a relatively higher performance and a relatively richer user interface than the first-level NLU sub-system 210.

Herein, the performance of an NLU sub-system/system is referred to as a performance of an NLU system judged from an F1 standpoint, with a higher F1 corresponding to a higher performance. Specifically, F1 is a measurement for performance that is typically employed to evaluate an NLU system, which can substantially be a combination of two other metrics: "precision" and "recall". Whereas "precision" is a percentage of system responses that were actually spoken by the user/speaker, "recall" is a percentage of ground truth tokens from the user/speaker that were recognized by the system. Ideal systems would have a precision and recall of both 100%, corresponding to an F1 of 100%. F1 is measured separately for intent classification and slot filling. It is noted that the performance of an NLU sub-system or an NLU system disclosed herein is not limited to the F1 performance, and can be determined by other performance evaluation metrics or approaches as well.

Herein the user interface in an NLU sub-system/system is referred to as an interface allowing a human agent (e.g. an application designer, a program developer, or a system maintainer, etc.) to manually, or as an interface allowing a computing device to automatically, update the data stored in the NLU sub-system/system, which can include NLU elements such as intents, slots, sample phrases, and responses, etc. A richer user interface for an NLU sub-system is referred to as having a higher level of configuration capability associated with the NLU sub-system/system. In one illustrating example, each second-level NLU sub-system 220 is designed be highly configurable by a human agent, whereas the first-level NLU sub-system 210 is provided with an interface allowing only automatic updates performed by a machine. It is noted, however, that the above example represents a simplified example serving for illustrating purposes only, and in real implementation, the first-level NLU sub-system 210 can be designed to allow for both manual and automatic configuration, and each of the at least one second-level NLU sub-system 220 can also be designed to allow for both manual and automatic configuration, yet each of the at least one second-level NLU sub-system 220 is provided with a relatively richer user interface than the first-level NLU sub-system 210.

Specifically, in a run-time phase of the NLU system, the first-level NLU sub-system 210 is configured, upon receiving the input text, to perform a first calculation over the input text, and if the first calculation generates a meaning corresponding to the input text with a first confidence level surpassing a first threshold, to output the meaning as an output result for the NLU system 200 (i.e. an NLU system output result), or if otherwise, to pass the input text to one of the at least one second-level NLU sub-system 210 for further determination based on a pre-determined rule.

Each of the at least one second-level NLU sub-system 220 is configured, upon receiving the input text passed on from the first-level NLU sub-system 210, to perform a second calculation over the input text, and if the second calculation generates a meaning corresponding to the input text with a second confidence level surpassing a second threshold, to output the meaning as the NLU system output result, or if otherwise, to output a result indicating a rejection of meaning as the NLU system output result.

Herein the meaning generated by the first-level NLU sub-system 210 or by any one of the at least one second-level NLU sub-system 220 can comprise intent and slots, which is typically associated with a confidence level, and is configured to be outputted as the NLU system output result only if the confidence level is larger than a certain threshold (i.e. the first threshold or the second threshold).

It is noted that, in addition to the intent and the slots, the meaning generated by the first-level NLU sub-system 210 or by each of the at least one second-level NLU sub-system 220 can also comprise other information (e.g. sample phrases, and responses, etc.), or can be represented in other formats. Each of the first threshold or the second threshold can be preset and can also be configurable based on practical needs. In one example, one of the first threshold or the second threshold can be preset as 95%, but can be other numbers depending on practical needs.

Each of the at least one second-level NLU sub-system 220 can be further configured to be specific to a different system, application, domain, and/or availability, etc. As such, the pre-determined rule by which the first-level NLU sub-system 210 passes the input text to one of the at least one second-level NLU sub-system 210 for further determination can be based on the different system, application, domain, and/or availability, in consistency to the architecture of the at least one second-level NLU sub-system 220.

In one illustrating example of an NLU system 200 with further reference to FIG. 2, the architecture for the at least one second-level NLU sub-system 220 is based on different domains, with each second-level NLU sub-system 220 corresponding to a different domain. Correspondingly, in the run-time phase of the NLU system 200, if no meaning having a first confidence level surpassing the first threshold is generated by the first calculation performed in the first-level NLU sub-system 210, the first-level NLU sub-system 210 can be further configured to determine a domain corresponding to the input text, and then to pass the input text to the one of the at least one second-level NLU sub-system 220 that corresponds to the domain for further determination of a meaning for the input text. As such, the pre-determined rule associated with the NLU system 200 is based on the domain information associated with the input text.

In another example with also reference to FIG. 2, the architecture for the at least one second-level NLU sub-system 220 is based on different systems, with each second-level NLU sub-system 220 corresponding to a different system. In a similar manner, if no meaning having a first confidence level surpassing the first threshold is generated by the first-level NLU sub-system 210, the first-level NLU sub-system 210 can be further configured to determine a system corresponding to the input text, and then to pass the input text to the one of the at least one second-level NLU sub-system 220 that corresponds to the system for further determination of a meaning for the input text. As such, the pre-determined rule is based on the system information associated with the input text.

In yet another example, the at least one second-level NLU sub-system 220 is built to be substantially backups from one another, and as such, the pre-determined rule can be the availability of each of the at least one second-level NLU sub-system 220. If no accepted meaning can be generated, the first-level NLU sub-system 210 can be further configured to determine the availability of each of the at least one second-level NLU sub-system 220, and then to pass the input text to the one of the at least one second-level NLU sub-system 220 that is available for further determination of a meaning for the input text.

The NLU sub-system 200 as described and illustrated above is also provided with a configuration mechanism.

According to some embodiments, each of the at least one second-level NLU sub-system 220 can be configured to periodically receive an update from a human agent (e.g. an application designer/developer), wherein the update may include addition of new NLU elements, alteration or deletion of existing NLU elements, in the each of the at least one second-level NLU sub-system 220. The F1 performance of the each of the at least one second-level NLU sub-system 220 may be increased as a result of the update.

Optionally, each of the at least one second-level NLU sub-system 220 can be further configured to periodically receive an automatic update from other NLU system (e.g. a different second-level NLU sub-system 220, the first-level NLU sub-system, or an external NLU system). In a first specific example, the at least one second-level NLU sub-system 220 is designed to be backups from one another, and among the at least one second-level NLU sub-system 220, a first second-level NLU sub-system can periodically receive an automatic update from a second second-level NLU sub-system. In a second specific example, the first-level NLU sub-system 210 is configured to receive a manual update from a human agent (e.g., a user or an application designer/developer), and accordingly, each of the at least one second-level NLU sub-system 220 is designed to periodically receive an update from the first-level NLU sub-system 210. In a third specific example, each of the at least one second-level NLU sub-system 220 is communicatively coupled to, and thereby is configured to periodically receive an automatic update from, an external NLU system.

Regarding the first-level NLU sub-system 210, according to some embodiment of the disclosure, it is configured to receive an automatic update from each of the at least one second-level NLU sub-system 220 on a periodic basis. Herein the automatic update may comprise extraction of all the NLU elements from each of the at least one second-level NLU sub-system 220 and configuration of the first-level NLU sub-system 210 using these extracted NLU elements. Yet the automatic update may alternatively comprise extraction of the NLU elements that have been recently updated in each of the at least one second-level NLU sub-system 220, and a subsequent configuration of the first-level NLU sub-system 210 using these extracted NLU elements. The F1 performance of the first-level NLU sub-system 210 can be increased as a result of the automatic update. Optionally, the first-level NLU sub-system 210 can be further configured to receive a manual update from a human agent (e.g. a user or an application designer/developer), and accordingly, each of the at least one second-level NLU sub-system 220 is further configured to periodically receive the manual update from the first-level NLU sub-system 210 to thereby allow a synchronization between the first-level NLU sub-system 210 and each of the at least one second-level NLU sub-system 220.

Taken together, in the NLU system 200 disclosed herein, the first-level NLU sub-system 210 is configured to periodically receive an automatic update from each of the at least one second-level NLU sub-system 220, and optionally is further configured to periodically receive a manual update, whereas each of the at least one second-level NLU sub-system 220 is configured to periodically receive a manual update from a human agent, and optionally is further configured to receive an automatic update from a different second-level NLU sub-system 220, the first-level NLU sub-system 210, or an external NLU system, depending on different configurations. Yet there is a periodical synchronization between the first-level NLU sub-system 210 and each of the at least one second-level NLU sub-system 220 to keep them updated.

In any of the embodiments as described above, the NLU elements can include, but are not limited to, intents, slots, sample phrases, responses, etc.

It is noted that there can be flexible configuration schemes for the NLU system disclosed herein. For example, the first-level NLU sub-system 210 can also be configured to allow a manual update of the NLU elements therein by a human agent, and the manual update on the first-level NLU sub-system 210 can also be allowed to transfer to one or more of the at least one second-level NLU sub-system 220 in a periodic and automatic manner.

In order to provide a more detailed description of the working process of the NLU system 200 described above and illustrated in FIG. 2, in the following, with reference to FIGS. 3, 4A, 4B, 5, 6A and 6B, the structure and the working process (i.e. a run-time phase and a configuration phase) of an NLU system according to two different embodiments of the disclosure are described in detail.

As illustrated in FIGS. 3-6, this specific embodiment of the NLU system 300 substantially includes one first-level NLU sub-system (i.e. "NLU1") 310 and one second-level NLU sub-system (i.e. "NLU2") 320, and it is further configured such that the first-level NLU sub-system 310 has a relatively higher per-transaction cost-effectiveness than the second-level NLU sub-system 320, and the second-level NLU sub-system 320 has a relatively higher F1 performance and a relatively richer user interface than the first-level NLU sub-system 310.

Figure 3:
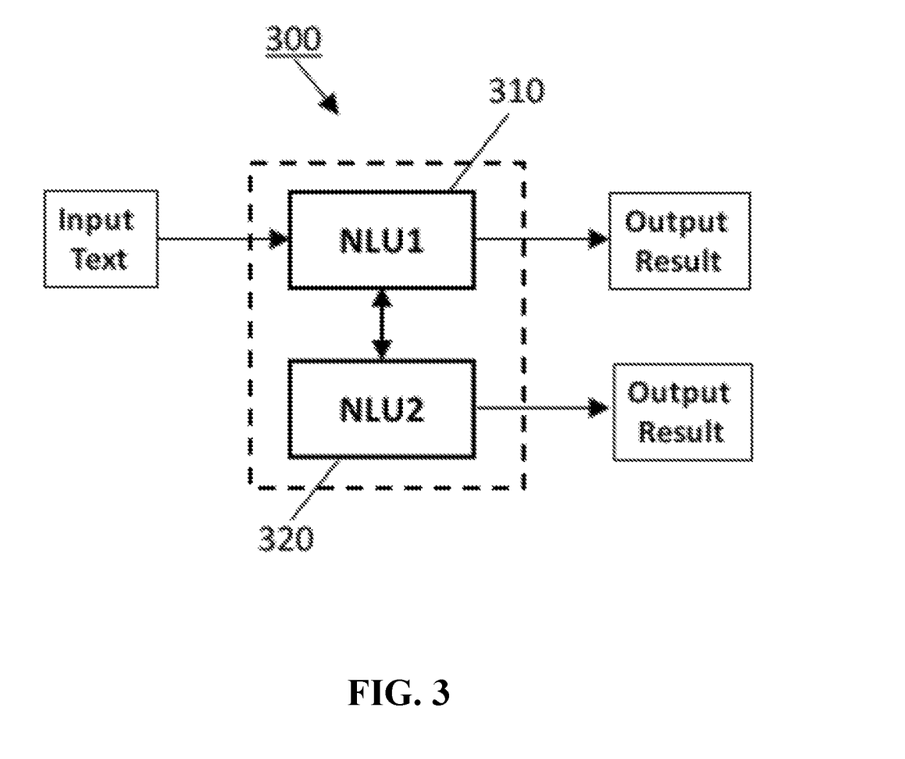
FIG. 3 illustrates a block diagram of an NLU system according to some specific embodiments of the disclosure.

As shown in FIG. 3, in the NLU system 300, the first-level NLU sub-system 310 is configured to directly receive an input text for the whole NLU system. The first-level NLU sub-system 310 and the second-level NLU sub-system 320 are configured to communicate with each other (as indicated by the double-headed arrow in the figure). Each of the first-level NLU sub-system 310 and the second-level NLU sub-system 320 can output an output result, but with the first-level NLU sub-system 310 acting first, followed by the second-level NLU sub-system 320 if no accepted meaning can be obtained from the first-level NLU sub-system 310.

Figure 4A:
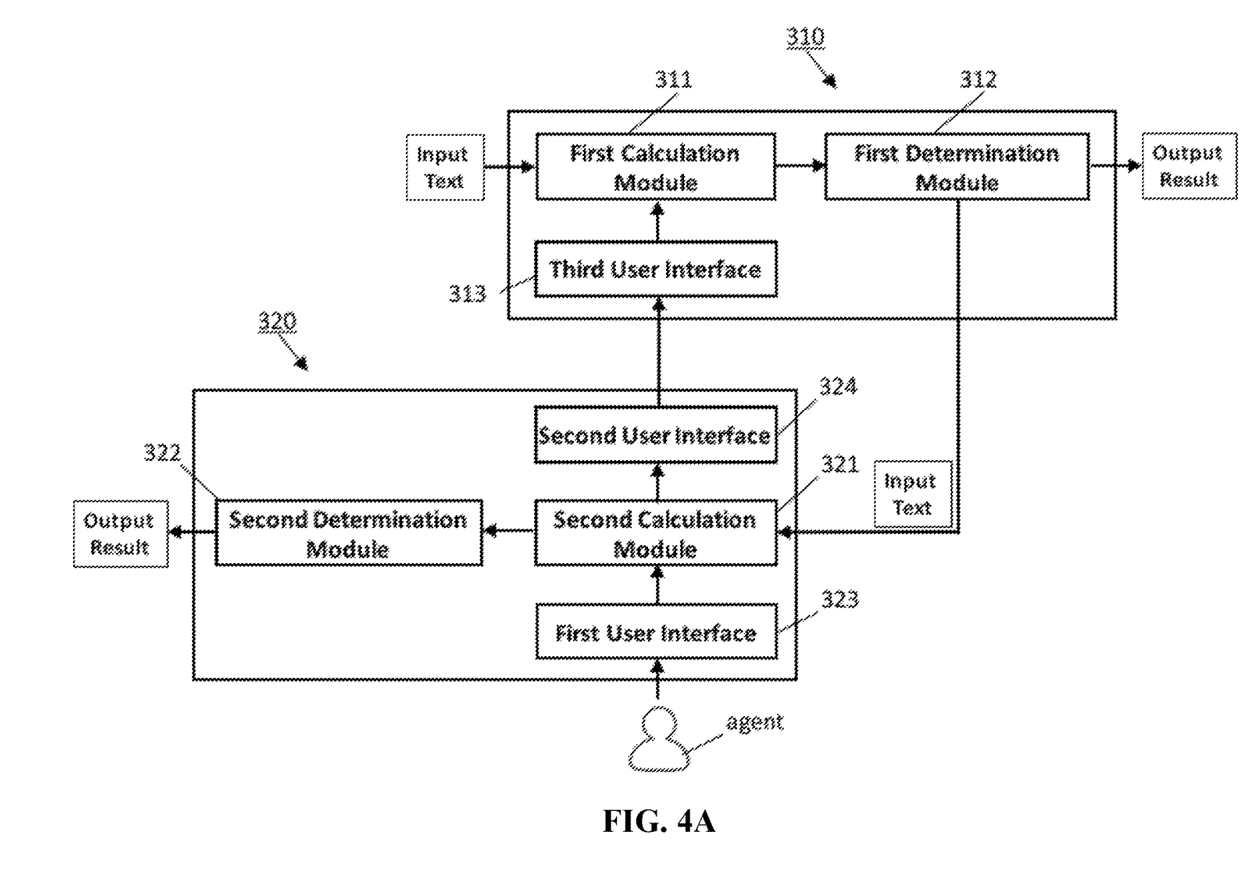
FIG. 4A illustrates a detailed block diagram of the first-level NLU sub-system 310 and the second-level NLU sub-system 320 in the NLU system 300 shown in FIG. 3 according to one embodiment of the disclosure.
Figure 4B:
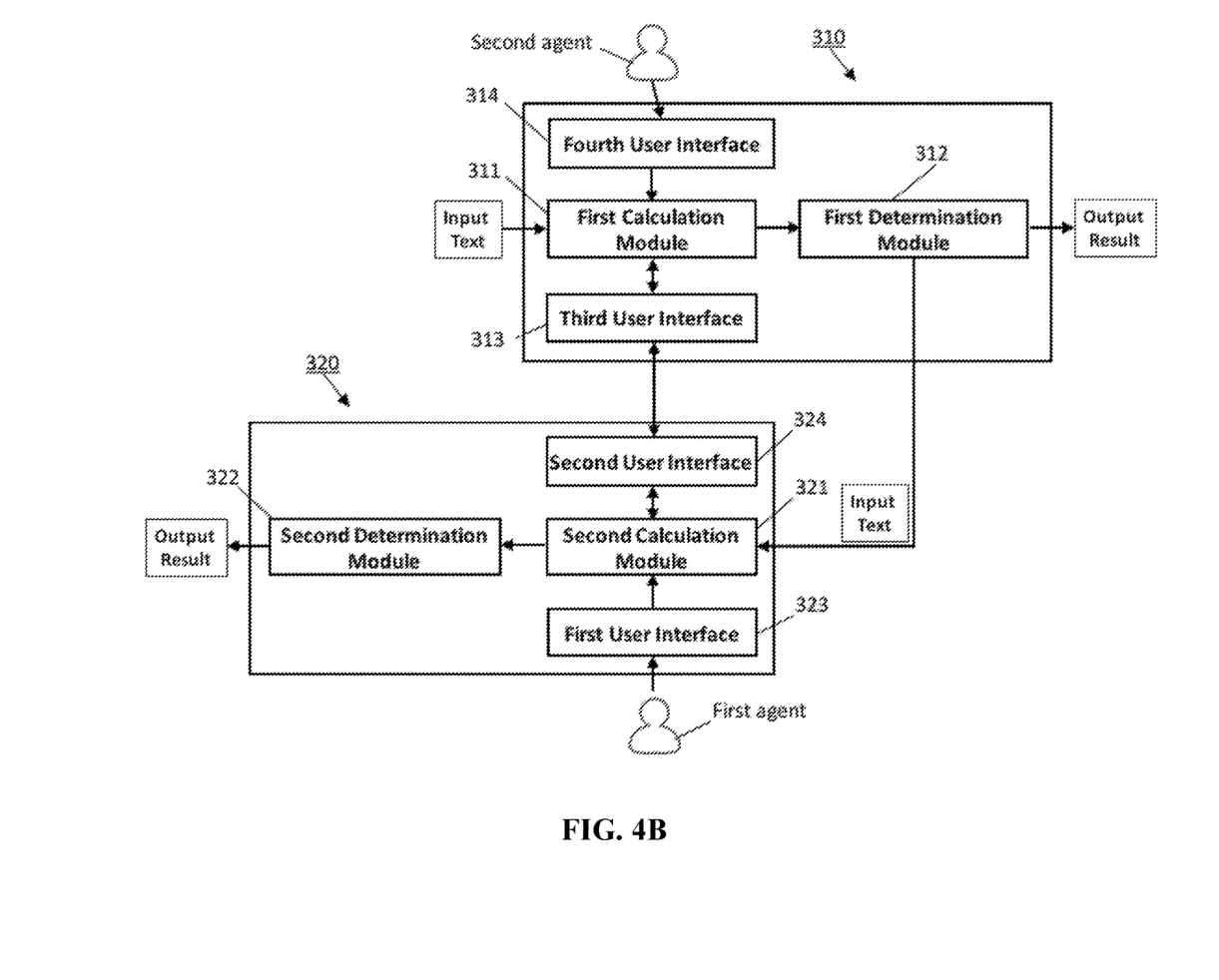
FIG. 4B illustrates a detailed block diagram of the first-level NLU sub-system 310 and the second-level NLU sub-system 320 in the NLU system 300 shown in FIG. 3 according to another embodiment of the disclosure.

FIG. 4A and FIG. 4B respectively illustrate a detailed block diagram of the first-level NLU sub-system 310 and the second-level NLU sub-system 320 in the NLU system 300 shown in FIG. 3 according to two different embodiments of the disclosure.

In both the first embodiment and the second embodiment of the NLU system 300 illustrated in FIG. 4A and FIG. 4B, the first-level NLU sub-system 310 comprises a first calculation module 311 and a first determination module 312, whereas the second-level NLU sub-system 320 comprises a second calculation module 321 and a second determination module 322.

In the first-level NLU sub-system 310, the first calculation module 311 is configured to perform a first calculation based on the input text that has been received by the first-level NLU sub-system 310, and then to send a first result obtained from the first calculation to the first determination module 312. The first determination module 312 is then configured to determine whether the first result comprises a meaning having a first confidence level surpassing a first threshold. If so, the meaning is outputted as the output result of the whole NLU system 300, or if otherwise, the input text is further passed to the second-level NLU sub-system 320 for further determination. Herein, in the first-level NLU sub-system 310, outputting of the meaning or the input text can optionally be performed by means of a first output module (not shown in the drawings).

Further in the second-level NLU sub-system 320, the second calculation module 321 is configured to perform a second calculation based on the input text received from the first-level NLU sub-system 310, and then to send a second result obtained from the second calculation to the second determination module 322. The second determination module 322 is then configured to determine whether the second result comprises a meaning having a second confidence level surpassing a second threshold. If so, the meaning is outputted as the output result of the whole NLU system 300, or if otherwise, a result indicating rejection of meaning is outputted as the output result of the whole NLU system 300. Herein, in the second-level NLU sub-system 320, outputting of the meaning or the result indicating rejection of meaning can optionally be performed by means of a second output module (not shown in the drawings).

Depending on whether the first-level NLU sub-system 310 is configured to receive a manual update of the configuration of NLU elements stored therein, the NLU system 300 can have different embodiments of configurations respectively illustrated in FIG. 4A and FIG. 4B.

In the first embodiment illustrated in FIG. 4A, the first-level NLU sub-system 310 is configured not to receive a manual update of the configuration of NLU elements, and is configured only to receive an automatic update the configuration of NLU elements from the second-level NLU sub-system 310. As such, the second-level NLU sub-system 320 further comprises a first user interface 323 and a second user interface 224, and the first-level NLU sub-system 310 further comprises a third user interface 313. The first user interface 323 in the second-level NLU sub-system 320 is configured to serve as a user interface allowing a human agent (shown as "agent" in the figure) to manually update the configuration of NLU elements in the second-level NLU sub-system 320, which is further transmitted to the second calculation module 321.

The second user interface 324 in the second-level NLU sub-system 320 and the third user interface 313 in the first-level NLU sub-system 310 are together configured to allow an automatic update of the configuration of NLU elements from the second-level NLU sub-system 320 to the first-level NLU sub-system 310, which can be on a periodic basis. Specifically, the second user interface 324 in the second-level NLU sub-system 320 is configured to allow the configuration of NLU elements to be outputted therefrom, and the third user interface 313 in the first-level NLU sub-system 310 is configured to allow the configuration of NLU elements to be retrieved thereto.

In a manner similar to the first embodiment illustrated in FIG. 4A, the second-level NLU sub-system 320 in the second embodiment in FIG. 4B allows a manual update of the configuration of NLU elements from a human agent (shown as "first agent" in FIG. 4B) to the second-level NLU sub-system 320 through the first user interface 323, which is further transmitted to the second calculation module 321. The second user interface 324 in the second-level NLU sub-system 320 and the third user interface 313 in the first-level NLU sub-system 310 further allow an automatic update of the configuration of NLU elements from the second-level NLU sub-system 320 to the first-level NLU sub-system 310, which can be on a periodic basis.

In a manner different from the first embodiment illustrated in FIG. 4A, in the second embodiment illustrated in FIG. 4B, the first-level NLU sub-system 310 is further configured to additionally receive a manual update of the configuration of NLU elements from a second human agent (shown as "second agent" in the figure). As such, the first-level NLU sub-system 310 further comprises a fourth user interface 314 configured to allow the second human agent to manually update the configuration of NLU elements into the first-level NLU sub-system 310, and to transmit the configuration of NLU elements to the first calculation module 311. Furthermore, the third user interface 313 and the second user interface 324 are further configured to transmit the configuration of NLU elements from the first-level NLU sub-system 310 to the second-level NLU sub-system 310, and the transmission can be on a periodic and automatic basis.

In any of the embodiments described above, the NLU elements can include information such as intents, slots, sample phrases and responses, etc., but can also include other information.

Figure 5:
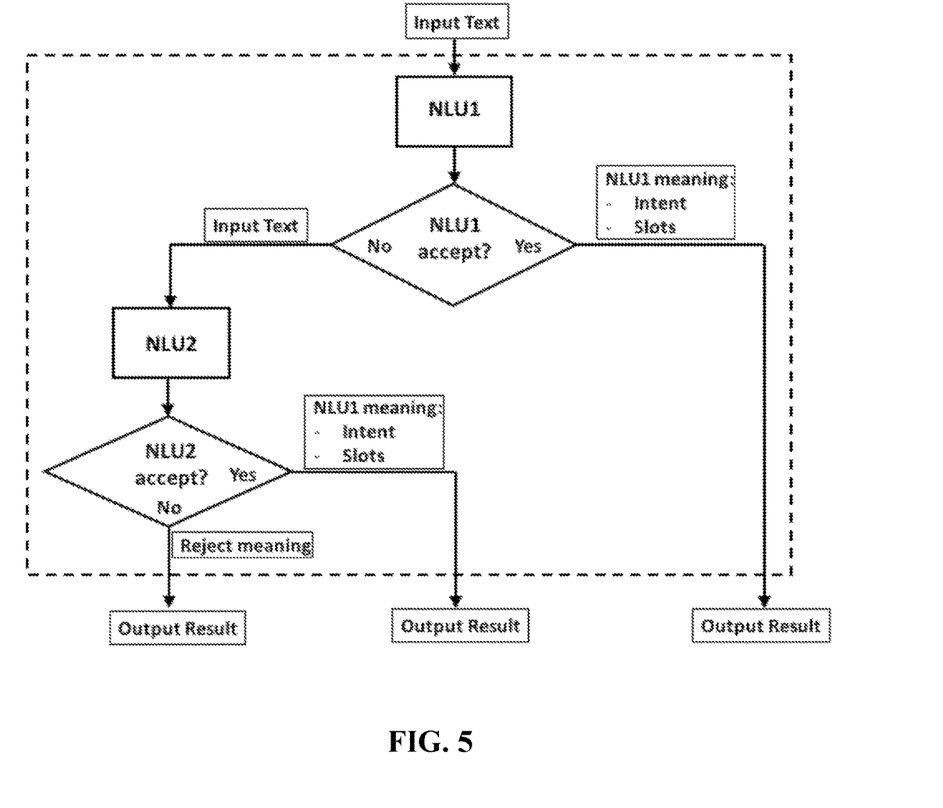
FIG. 5 is a working process for the run-time phase of the NLU system shown in FIG. 3 according to some embodiments of the disclosure.

FIG. 5 illustrates a working process for the run-time phase of the NLU system 300 shown in FIG. 3 according to some embodiments of the disclosure.

As shown in FIG. 5, the input text is first inputted into the first-level NLU sub-system 310, where a first calculation is performed to attempt to identify a meaning for the input text, which comprises the determination of both an intent and one or more slots that are associated with the input text, but can also include the determination of other information (e.g. sample phrases, and responses, etc.) corresponding to the input text as well.

If a meaning generated by the first calculation performed in the first-level NLU sub-system 310 is associated with a first confidence level surpassing a first threshold (e.g. 90%), the meaning (as indicated by the rectangular box labelled with "NLU1 meaning" in FIG. 3) is accepted (as indicated by "Yes" at the right corner of the diamond standing for NLU1 310 in the figure) and is further outputted as an output result for the whole NLU system 300 (as illustrated by the right-most downward arrow in the figure).

If otherwise, no meaning is accepted by the first-level NLU sub-system 310 (i.e., no meaning generated by the first calculation performed in the first-level NLU sub-system 310 is associated with a first confidence level that surpasses the first threshold, as indicated by "No" at the left corner of the diamond standing for NLU1 310 in FIG. 3), and the input text is further passed on to the second-level NLU sub-system 320.

In the second-level NLU sub-system 320, a second calculation is performed to attempt to identify a meaning for the input text, which comprises the determination of both an intent and one or more slots that correspond to the input text, just like the first calculation performed by the first-level NLU sub-system 310.

If a meaning generated by the second calculation performed in the second-level NLU sub-system 320 is associated with a second confidence level surpassing a second threshold (e.g. 95%), the meaning (as indicated by the rectangular box labelled with "NLU2 meaning" in FIG. 3) is accepted (as indicated by "Yes" at the right corner of the diamond standing for NLU2 320 in the figure) and is further outputted as an output result for the whole system of the NLU system (as illustrated by the middle downward arrow in the figure).

If otherwise, no meaning is accepted by the second-level NLU sub-system 320 (i.e., no meaning generated by the second calculation performed in the second-level NLU sub-system 320 is associated with a second confidence level that surpasses the second threshold, as indicated by "No" at the bottom corner of the diamond standing for NLU2 320 in FIG. 3), a result indicating such (i.e. "reject meaning") is outputted as an output result for the whole NLU system 300 (as illustrated by the left-most downward arrow in the figure).

Figure 6A:
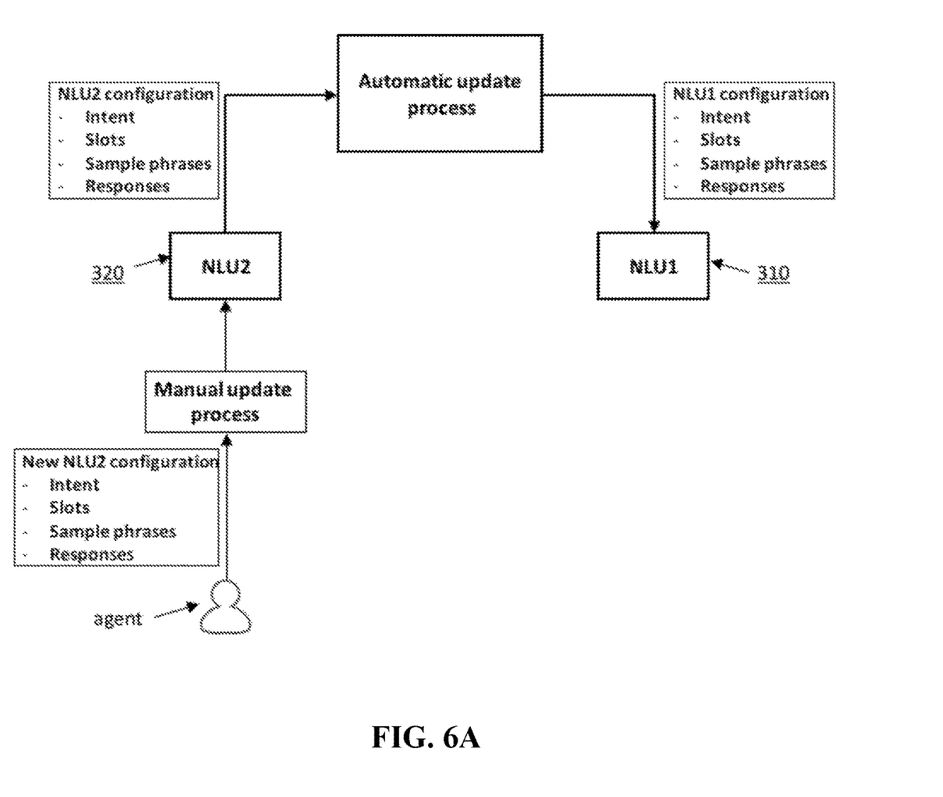
FIG. 6A is a working process for the configuration phase of the first embodiment of the NLU system 300 shown in FIG. 4A.

FIG. 6A is a working process for the configuration phase of the first embodiment of the NLU system 300 shown in FIG. 4A.

As shown in FIG. 6A, the configuration phase of the first embodiment of the NLU system 300 substantially comprises a manual update process and an automatic update process. In the manual update process, a human agent (shown as "agent" in the figure) manually inputs new configuration data (shown as "new NLU2 configuration" in the figure) to the second-level NLU sub-system 320 (shown as "NLU2" in the figure) for a periodic update of NLU elements in the second second-level NLU sub-system 320, and this manual update process can be done through the first user interface 323 shown in FIG. 4A.

In the automatic update process, the configuration data for the second-level NLU sub-system 320 is taken out from the second-level NLU sub-system 320 and is further transmitted to the first-level NLU sub-system 310 (shown as "NLU1" in the figure) to thereby become configuration data for the first-level NLU sub-system 310. The automatic update process can be performed through the second user interface 324 and the third user interface 313 shown in FIG. 4A.

Figure 6B:
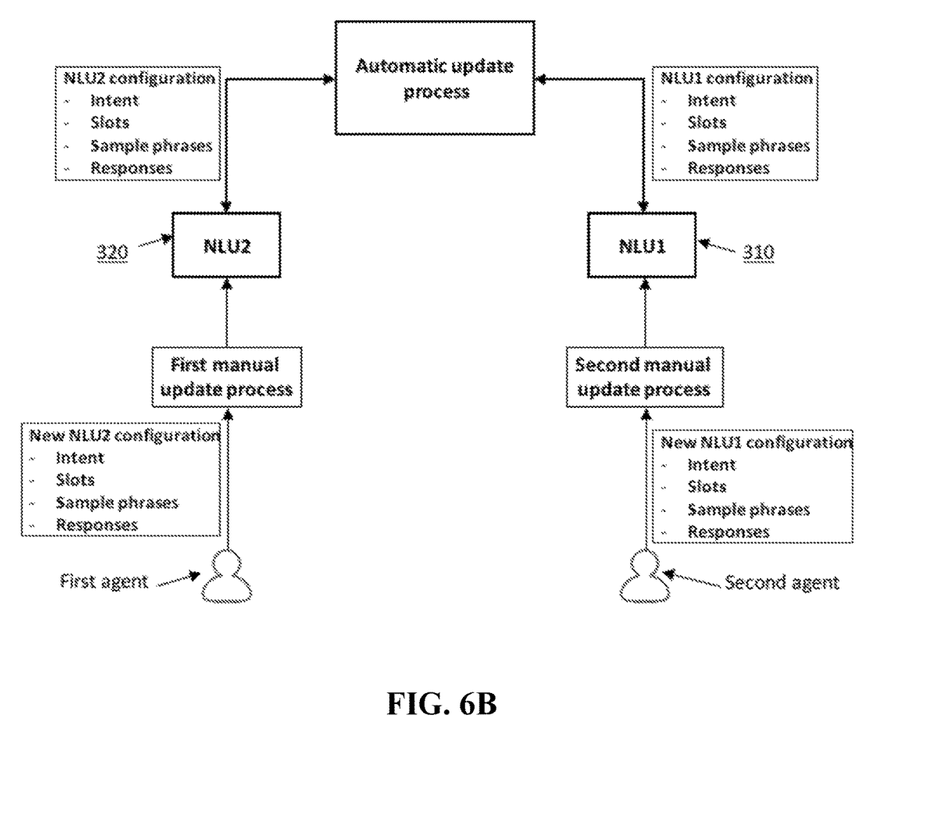
FIG. 6B is a working process for the configuration phase of the second embodiment of the NLU system 300 shown in FIG. 4B.

FIG. 6B is a working process for the configuration phase of the second embodiment of the NLU system 300 shown in FIG. 4B. Compared with the first embodiment of the NLU system 300 illustrated in FIG. 4A, in the second embodiments of the NLU system 300 illustrated in FIG. 4B, the first-level NLU sub-system 310 is configured to further allow a manual update for the NLU elements, in addition to receiving an automatic update from the second-level NLU sub-system 320. As such, the configuration phase of this second embodiment of the NLU system 300 substantially comprises a first manual update process, a second manual update process, and an automatic update process, as illustrated in FIG. 6B.

In a manner similar to working process of the first embodiment, the first manual update process allows a first human agent (shown as "first agent" in FIG. 6B) to manually input new configuration data to the second-level NLU sub-system 320 via the first user interface 323 to periodically update the NLU elements stored therein to thereby obtain an updated NLU2 configuration data, and the automatic update process further allows the configuration data for the second-level NLU sub-system 320 to be transmitted from the second-level NLU sub-system 320 to the first-level NLU sub-system 310.

As further illustrated in FIG. 6B, the second manual update process allows a second human agent (shown as "second agent" in the figure) to manually input new configuration data to the first-level NLU sub-system 310 for updating the NLU elements stored therein, and the automatic update process further allows the configuration data for the first-level NLU sub-system 310 to be transmitted from the first-level NLU sub-system 310 to the second-level NLU sub-system 320. As such, the automatic update process in the second embodiment of the NLU system is substantially a bi-directional automatic update process that allows the configuration data of NLU elements stored respectively in the first-level NLU sub-system 310 and in the second-level NLU sub-system 320 to be synchronized, which is also performed by means of the second user interface 324 and the third user interface 313 shown in FIG. 4B.

In any embodiment of the NLU system 300, the configuration data can include NLU elements such as intents, slots, sample phrases and responses, etc.

In summary, the specific embodiment of the NLU system 300 as described above and illustrated in FIGS. 3-6 involves two NLU sub-systems: a first-level NLU sub-system 310 (i.e. NLU1) and a second-level NLU sub-system 320 (i.e. NLU2). The first-level NLU sub-system 310 substantially functions as a front-end NLU sub-system that can directly receive an input text and perform a first calculation thereover to attempt to obtain a meaning corresponding to the input text, whereas the second-level NLU sub-system 320 is triggered for a second calculation on the input text to attempt to obtain the meaning only if it is necessary (i.e. only when the first-level NLU sub-system 310 fails).

Because the first-level NLU sub-system 310 has relatively lower performance from an F1 standpoint and also not as rich a user interface, it costs substantially less on a per-transaction basis than the second-level NLU sub-system 320. On the other hand, because the second-level NLU sub-system 320 has a relatively higher F1 performance, and it is triggered to perform calculation only when necessary (i.e. when the first-level NLU sub-system 310 fails). Therefore, a highest performance result can be obtained.

In addition, because of its relatively richer user interface for configuration, the second-level NLU sub-system 320 can, according to some embodiments as shown in FIG. 4A and FIG. 6A, substantially function as a back-end NLU sub-system specifically used for application designers/developers to manually update the NLU configurations, which are further periodically synchronized with the first-level NLU sub-system 310 through an automatic update process. Over time, more and more requests would expectedly be able to be processed by the second-level NLU sub-system 320, because new phrases are added manually to the second-level NLU sub-system 320 and then are also periodically and automatically added to the first-level NLU sub-system 310, the F1 performance for both the second-level NLU sub-system 320 and the first-level NLU sub-system 310 will be increased over time.

It is noted that although the above structure and the working process has been described for the embodiment of the NLU system 300 mentioned above having only one second-level NLU sub-system 320, other embodiments of the NLU system having more than one second-level NLU sub-system can have substantially same structures and working processes, and also have a substantially same advantage discussed above, yet in these other embodiment of the NLU system, the first-level NLU sub-system can be further provided with a second-level NLU sub-system determining module (not shown in the drawings), which is configured, based on a pre-determined rule, to determine which one of the at least one second-level NLU sub-system the first-level NLU sub-system sends the input text to if the first calculation performed in the first-level NLU sub-system fails (i.e. no meaning calculated by the first calculation is accepted by the first-level NLU sub-system). Herein the pre-determined rule can be based on different system, application, domain, and/or availability.

In a second aspect, the present disclosure further provides a dialogue systems, which comprises a natural language understanding (NLU) component. The NLU component can comprise any one of the embodiments of the NLU system as described above.

In addition to the NLU component, the dialogue systems further comprises an input decoder configured to convert a user input into an input text, which is further fed into the NLU component for generation of a meaning corresponding to input text and the user input.

Herein, the input decoder can be an ASR component, configured to convert a user input in the form of speech into an input text. Optionally, the input decoder can also be a handwriting recognizer or an optical character recognizer (OCR), which specifically converts characters in an image into an input text for determination of its meaning.

According to some embodiments of the disclosure, the dialogue systems can be a speech-based automatic dialogue systems as illustrated in FIG. 1, and the input decoder for the dialogue systems is thus an ASR component. Specifically, the input text for the NLU system (i.e. the NLU component 20) is substantially generated by, and transmitted from, an ASR component 10, whereas the output result of the NLU component 20, regardless of being a meaning obtained by the first-level NLU sub-system, being a meaning obtained by one of the at least one second-level NLU sub-system, or being a result indicating a rejection of meaning, is further transmitted to a downstream dialogue manager (DM) component 30, for appropriate subsequent actions.

It is noted that in addition to the speech-based automatic dialogue systems, the dialogue systems can be of other types that also requires the NLU component.

According to some embodiments, the NLU component of the dialogue systems comprises an electronic device and a server, which are respectively provided with a first-level NLU sub-system and a second-level NLU sub-system of the NLU system. The electronic device is communicatively connected with the server through a wired or wireless communication approach to thereby allow a communication between the first-level NLU sub-system and the second-level NLU sub-system.

Herein the electronic device can be for consumer use, and can be a smartphone, a smart speaker, a tablet computer, a laptop, or a personal computer, etc., which is provided with the first-level NLU sub-system. The first-level NLU sub-system functions substantially as a basic NLU engine in the electronic device, which is configured to directly interact with a user to provide a basic-level NLU service to user inputs (e.g. voices, images, or texts) that have been converted into input texts through an input decoder component (e.g. ASR, OCR, etc.) installed also in the electronic device.

The server is provided with the second-level NLU sub-system. The second-level NLU sub-system functions substantially as an advanced NLU engine, which is triggered to perform a more advanced calculation to obtain a meaning for the user inputs only if the basic NLU engine in the electronic device fails. The server can be arranged in a cloud, and can be communicatively connected to the electronic device via a wireless mobile network. There are no limitations herein.

Specifically, the electronic device can, upon receiving a user input, attempt to directly obtain a meaning for it by means of the basic NLU engine (i.e. the first-level NLU sub-system) that is locally installed in the electronic device. If the basic NLU engine in the electronic device determines that no satisfactory interpretation can be generated (for example, no meaning is accepted having a confidence level >90%), the electronic device transmits the user input to the advanced NLU engine (i.e. the second-level NLU sub-system) in the server, where a more advanced calculation is performed to attempt to obtain a meaning for the user input. Ultimately, a meaning or a result indicating rejection of meaning obtained by the advanced NLU engine can be further transmitted back to the electronic device.

Based on the meaning produced by the basic NLU engine or by the advanced NLU engine, the electronic device can further provide meaningful outputs or to facilitate actions with one or more applications accessible via the electronic device. Furthermore, the advanced NLU engine in the cloud can be manually updated on a periodic basis, and the updated NLU elements in the advanced NLU engine can be further provided to the basic NLU engine in the electronic device through synchronization.

It is noted that this above example is only for illustrating purposes only, and other possibilities also exist. For example, more than one advanced NLU engine (i.e. second-level NLU sub-system), corresponding respectively to different domains, can be arranged in more than one server respectively. As such, when necessary, the electronic device can communicate with one of the servers that is specific to one particular domain to thereby obtain an advanced NLU service based on the domain information determined. The more than one server can be arranged in a cloud.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A natural language understanding (NLU) system for determining a meaning of an input text, comprising:
   a first-level NLU sub-system, configured to receive the input text; and
   at least one second-level NLU sub-system, each communicatively coupled with, and having a relatively higher performance than, the first-level NLU sub-system;
   wherein:
      the first-level NLU sub-system is configured, upon receiving the input text, to perform a first calculation over the input text, and then:
         if the first calculation generates a first meaning corresponding to the input text with a first confidence level surpassing a first threshold, to output the first meaning; or
         if otherwise, to pass on the input text to one of the at least one second-level NLU sub-system based on a pre-determined rule;
      and
      each of the at least one second-level NLU sub-system is configured, upon receiving the input text from the first-level NLU sub-system, to perform a second calculation over the input text, and then:
         if the second calculation generates a second meaning corresponding to the input text with a second confidence level surpassing a second threshold, to output the second meaning; or
         if otherwise, to output a result indicating a rejection of meaning.

2. The natural language understanding (NLU) system of claim 1, wherein each of the at least one second-level NLU sub-system has a relatively richer user interface than the first-level NLU sub-system, wherein:
   each of the at least one second-level NLU sub-system is further configured to periodically receive a first manual update for NLU elements; and
   the first-level NLU sub-system is further configured to periodically receive a first automatic update for NLU elements from each of the at least one second-level NLU sub-system.

3. The natural language understanding (NLU) system of claim 2, wherein:
   the first-level NLU sub-system is further configured to receive a second manual update for NLU elements; and
   each of the at least one second-level NLU sub-system is further configured to periodically receive a second automatic update for NLU elements from the first-level NLU sub-system.

4. The natural language understanding (NLU) system of claim 1, wherein the performance is evaluated from an F1 standpoint.

5. The natural language understanding (NLU) system of claim 1, wherein at least one of the first meaning and the second meaning is in a format of intent and slot.

6. The natural language understanding (NLU) system of claim 1, wherein the first-level NLU sub-system comprises:
   a first calculation module, configured to perform the first calculation over the input text to thereby generate a first result from the first calculation; and
   a first determination module, configured to receive the first result from the first calculation module, and then to determine whether the first result comprises the first meaning.

7. The natural language understanding (NLU) system of claim 1, wherein each of the at least one second-level NLU sub-system comprises:
   a second calculation module, configured to perform the second calculation over the input text to thereby generate a second result from the second calculation; and
   a second determination module, configured to receive the second result from the second calculation module, and then to determine whether the second result comprises the second meaning.

8. The natural language understanding (NLU) system of claim 2, wherein each of the at least one second-level NLU sub-system comprises a first user interface, configured to allow a first human agent to manually update configuration of NLU elements in the each of the at least one second-level NLU sub-system therethrough.

9. The natural language understanding (NLU) system of claim 2, wherein:
- each of the at least one second-level NLU sub-system comprises a second user interface; and
- the first-level NLU sub-system comprises a third user interface;

wherein:
- the second user interface and the third user interface are together configured to allow a first automatic periodic update of configuration of NLU elements from the each of the at least one second-level NLU sub-system to the first-level NLU sub-system.

10. The natural language understanding (NLU) system of claim 9, wherein:
- the first-level NLU sub-system further comprises a fourth user interface, configured to allow a second human agent to manually update configuration of NLU elements in the first-level NLU sub-system therethrough; and
- the second user interface and the third user interface are together further configured to allow a second automatic periodic update of configuration of NLU elements from the first-level NLU sub-system to the each of the at least one second-level NLU sub-system.

11. The natural language understanding (NLU) system of claim 1, wherein a number of the at least one second-level NLU sub-system is one.

12. The natural language understanding (NLU) system of claim 1, wherein a number of the at least one second-level NLU sub-system is more than one.

13. The natural language understanding (NLU) system of claim 12, wherein each of the at least one second-level NLU sub-system is specific to a different domain, and the pre-determined rule is based on domain information associated with the input text.

14. The natural language understanding (NLU) system of claim 12, wherein each of the at least one second-level NLU sub-system is specific to a different system, and the pre-determined rule is based on system information associated with the input text.

15. The natural language understanding (NLU) system of claim 12, wherein the pre-determined rule is based on availability of each of the at least one second-level NLU sub-system.

16. A dialogue systems, comprising a natural language understanding (NLU) component, wherein the natural language understanding (NLU) component comprises a natural language understanding (NLU) system according to claim 1.

17. The dialogue systems according to claim 16, further comprising an input decoder, configured to convert a user input into the input text for the natural language understanding (NLU) component.

18. The dialogue systems according to claim 17, wherein the input decoder comprises an automatic speech recognizer (ASR) component, configured to convert a speech from a user into the input text.

19. The dialogue systems according to claim 17, wherein the input decoder comprises an optical character recognizer (OCR) component, configured to convert characters in an image into the input text.

20. The dialogue systems according to claim 16, wherein the natural language understanding (NLU) component comprises:
- an electronic device, provided with the first-level NLU sub-system of the natural language understanding (NLU) system; and
- at least one server, respectively provided with the at least one second-level NLU sub-system of the natural language understanding (NLU) system;

wherein:
- the electronic device is communicatively connected with the at least one server to thereby allow communication between the first-level NLU sub-system and the at least one second-level NLU sub-system.

21. The dialogue systems according to claim 20, wherein the electronic device is a smartphone, a smart speaker, a tablet computer, a laptop, or a personal computer.

22. The dialogue systems according to claim 20, wherein each of the at least one server is in a cloud.

* * * * *